United States Patent
Wang

(10) Patent No.: US 9,880,873 B2
(45) Date of Patent: Jan. 30, 2018

(54) ELECTRONIC OFFICIAL DOCUMENT PROCESSING METHOD

(71) Applicant: Fujian Foxit Software Development Joint Stock Co., Ltd., Fuzhou (CN)

(72) Inventor: Guojia Wang, Beijing (CN)

(73) Assignee: Fujian Foxit Software Development Joint Stock Co., Fuzhou (CN)

( * ) Notice: Subject to any disclaimer, the term of this patent is extended or adjusted under 35 U.S.C. 154(b) by 17 days.

(21) Appl. No.: 14/442,146

(22) PCT Filed: Nov. 1, 2013

(86) PCT No.: PCT/CN2013/001324
§ 371 (c)(1),
(2) Date: May 12, 2015

(87) PCT Pub. No.: WO2014/071687
PCT Pub. Date: May 15, 2014

(65) Prior Publication Data
US 2016/0232030 A1 Aug. 11, 2016

(30) Foreign Application Priority Data
Nov. 12, 2012 (CN) .......................... 2012 1 0451910

(51) Int. Cl.
*G06F 9/46* (2006.01)
*G06Q 10/06* (2012.01)
*G06F 9/44* (2006.01)

(52) U.S. Cl.
CPC ................ *G06F 9/465* (2013.01); *G06F 9/44* (2013.01); *G06Q 10/06* (2013.01)

(58) Field of Classification Search
None
See application file for complete search history.

(56) References Cited

U.S. PATENT DOCUMENTS

2003/0217264 A1 11/2003 Martin et al.
2012/0079409 A1* 3/2012 Luo .......................... G06F 8/36
715/772

FOREIGN PATENT DOCUMENTS

CN 101404076 4/2009
CN 102385725 3/2012

OTHER PUBLICATIONS

International Search Report of PCT/CN2013/001324 dated Feb. 13, 2014, 4 pages (English and Chinese translations).

* cited by examiner

*Primary Examiner* — Kenneth Tang
(74) *Attorney, Agent, or Firm* — Rankin, Hill & Clark LLP

(57) ABSTRACT

An electronic official document (EOD) processing method, wherein a work action set consisting of N work actions is defined, comprising: (1) selecting M work actions from the work action set, setting a corresponding working user for each selected work action, and sequencing all selected work actions into a workflow by order of execution; (2) inputting a to-be-processed EOD as a first EOD into the first work action in the workflow; (3) starting an integer i from 1 and increasing the integer i by 1 each time until the integer i reaches M, and executing the following every time the integer i is increased: the working user corresponding to the i-th work action performs an operation specified in the i-th work action on the No. i EOD, and stores the processing result as a No. i+1 EOD; and (4) outputting the No. M+1 electronic document as the processing result.

10 Claims, 2 Drawing Sheets

ELECTRONIC OFFICIAL DOCUMENT PROCESSING METHOD

TECHNICAL FIELD

This invention relates to a technical field of processing electronic documents, particularly to a method for processing electronic documents.

BACKGROUND

Electronic documents refer to electronic data of an official document, which is endowed with a standard format, formed in a computer network system. Common electronic official documents include electronic manuscripts edited by a press, electronic documents which flow within a Government, etc.

Handling an electronic official document involves certain processes; FIG. 1 is a flow diagram of an existing method of processing the electronic official document. As shown in FIG. 1, there are X types of process modes for the electronic official document 101 to be processed, X is an integer no less than 1, and each process mode is expressed by a single operation flow (such as the first operation flow 101, the second operation flow 103, the X-th operation flow 104 in FIG. 1), thus, after different operation flows are performed on the same electronic official document 101, different performance outcomes would be obtained (such as the first performance outcome 105, the second performance outcome 106, the X-th performance outcome 107, in FIG. 1). The existing operation flows are all fixed operation flows, which cannot be modified after they are determined, and if the nodes in the operation flows need to do actions such as adding, deleting, and modifying, then the operation flows must be re-compiled, in addition, if the electronic official document is to be processed in various ways, then codes for the multiple operation flows would be compiled, and thus it may becomes much more time-consuming and laborious, and takes a big inconvenience to handling the electronic official document.

SUMMARY OF THE INVENTION

What the invention solves about the technical problem is to provide a method for processing an electronic official document, which can facilitate processing the electronic document.

The technical solution of the present invention for the above technical problem is to provide a method predefining a set of operation behaviors consisting of N operation behaviors, wherein N is an integer greater than 1; the method comprises:

Step 1: Selecting M operation behaviors from the set of operation behaviors, and setting up a corresponding operation user for each one of the M selected operation behaviors, and sorting all of the M selected operation behaviors into an operation flow according to an execution order; wherein, M is an integer no less than 1;

Step 2: regarding the electronic official document to be processed as a first electronic official document, and inputting it into the first operation behavior in the operation flow;

Step 3: Increasing an integer i from 1 by 1 each time until the integer i reaches M, wherein, after each increase, the following sub-steps are executed one time: the operation user corresponding to an i-th operation behavior performs an action specified by the i-th operation behavior on an i-th electronic official document so as to get an i-th performance outcome, and storing the i-th performance outcome as an i+1-th electronic official document;

Step 4: outputting an M+1-th electronic official document as an overall performance outcome.

A beneficial technical effect of the present invention is in that: M operation behaviors which can be selected from the set of operation behaviors are ranked as an operation flow in the present invention, thus users can compile a required operation flow according to requirement situations, and then a performance outcome could be obtained by performing an action specified by the corresponding operation behaviors to be performed on the electronic official document to be processed successively by each operation user. Therefore, when the nodes in the operation flow are to be added, deleted, modified, the operation flow can be re-compiled by means of adding, deleting, modifying operation behaviors, which greatly reduces the time to change the operation flow, simplifies the processes in the operation flows, thereby facilitates processing the electronic document.

On the basis of the technical solution, the present invention may also comprise the following improvements:

Further, the method further predefines a step code corresponding to each operation behavior one to one in the set of operation behaviors; Then In the Step 1, the method of selecting M operation behaviors from the set of operation behaviors is: choosing M step codes, thus the M operation behaviors in the set of operation behaviors, which corresponding respectively with the selected M step codes, are checked.

Further, in the step 3, an action specified by the i-th operation behavior includes: modifying a title of the i-th electronic official document; and/or, modifying a content of the i-th electronic official document; and/or, modifying an author of the i-th electronic official document; and/or, examining and approving the content of the i-th electronic official document; and/or, signing on the i-th electronic official document; and/or, sealing on the i-th electronic official document.

Further, M is an integer no less than 2;

After the step 1, and prior to the step 2, further comprising a sub-step 1-1: removing P operation behaviors from the operation flow, and sorting the rest M-P operation behaviors into a new operation flow according to a new execution order, wherein, P is an integer no less than 1 and less than M;

Then the Step 2 is changed as follows: regarding the electronic official document to be processed as a first electronic official document, and inputting it into the first operation behavior in the new operation flow;

Further, after the step 1, and prior to the step 2, further including a sub-step 1-2: Selecting Q operation behaviors besides the M operation behaviors from the set of operation behaviors, and sorting the selected M+Q operation behaviors into a novel operation flow according to a novel execution order, wherein, Q is a integer no less than 1;

Then the Step 2 is changed as follows: regarding the electronic official document to be processed as a first electronic official document, and inputting it into the first operation behavior in the novel operation flow;

Further, after the step 1, and prior to the step 2, further including a sub-step 1-3: determining a name of the operation flow.

DETAILED DESCRIPTION OF THE EMBODIMENTS

With reference to the accompanying drawings, the description of the principles and features of the present invention are given as follows. The given embodiments are only intended to illustrate the present invention, but not to limit the protection scope of the present invention.

Figure 1:
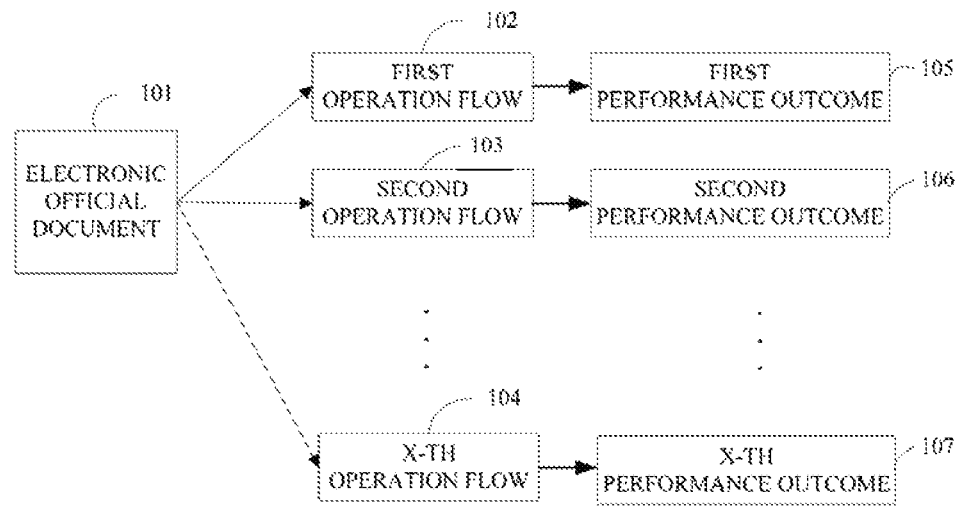
FIG. 1 is a flow diagram of an existing method for processing an electronic official document.
Figure 2:
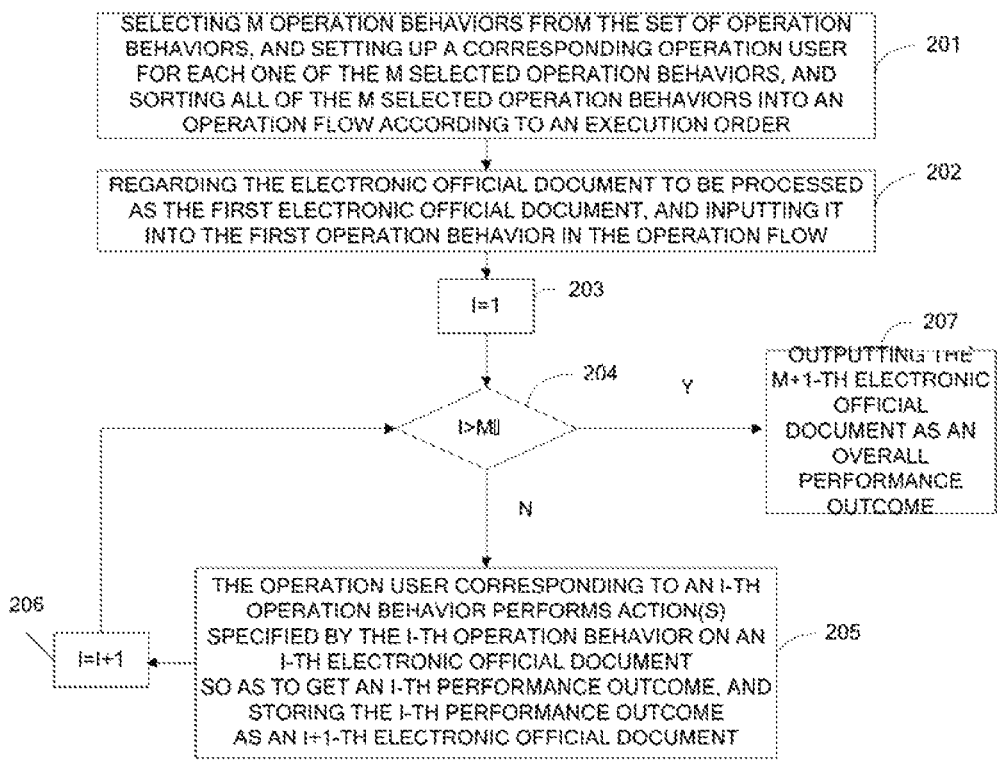
FIG. 2 is a flow diagram of the method for processing the electronic official document according to the present invention.

FIG. 2 is a flow diagram of the method for processing an electronic official document according to the present invention; the method predefines a set of operation behaviors consisting of N operation behaviors, N is an integer greater than 1. In the present invention, the operation behavior refers to an action to be performed on the electronic official document, and this action are pre-designate, and the actions regulated by any two operation behaviors in the set of operation behaviors are different from each other.

As shown in FIG. 2, the method comprising:

Step 201: Selecting M operation behaviors from the set of operation behaviors, and setting up the operation user corresponding for each one of the M selected operation behaviors, and sorting all of the M selected operation behaviors into an operation flow according to an execution order one after another;

M is an integer no less than 1 at this step.

In the step 201, The "M operation behaviors" are selected according to a requirement for processing the electronic official document. For example, if the electronic official document are required to be edited, an action such as editing the electronic official document is selected as a specified operation behavior; and if the electronic official document is required to be finalized, an action such as finalizing the electronic official document are selected as a specified operation behavior; and so on.

In this step 201, "the operation user corresponding to the each one of the M selected operation behaviors" refers to the operation user stipulated by the operation behavior so as to implement the operation behavior. For example, the firstly reviewing operation behavior to the electronic official document, corresponds to the operation user who is the editor for firstly reviewing the electronic official document, instead of the editor for secondly reviewing electronic document.

Each operation behavior selected in this step 201 may appear in the operation flow only one time or more than one times. In addition, the operation behavior can be used by different users (i.e. operators who perform actions) in the same operation flow. For example, the entire operation flow is to review an electronic official document three times, then M is equal to 3, but in this step 201, it is simply required to select the same operation behavior of reviewing electronic official document three times, but the operation flow formed by sorting the operation behaviors includes firstly, secondly and thirdly reviewing the electronic official document. Therefore, M may be greater than N when some of the selected operation behaviors are repeated, that is, some of the selected operation behaviors appear more than one time.

Step 202: regarding the electronic official document to be processed as a first electronic official document, and inputting it into the first operation behavior in the operation flow;

Each operation behavior has not only a performer, which is its corresponding operation user, but also its own process object, namely an electronic document. In order to distinguish the electronic official documents processed by each operation behavior in the operation flow, the electronic official documents processed by each operation behavior are sorted in the present invention. That is, the process object of the first operation behavior is called as a first electronic document; similarly, the process object of the second operation behavior is called as a second electronic document; and so on.

Step 203: an integer i is set to 1.

Step 204: determining whether the integer i is greater than M or not, if "yes", then step 207 is implemented, otherwise step 205 is implemented.

Step 205: the operation user corresponding to an i-th operation behavior performs action specified by the i-th operation behavior on an i-th electronic official document so as to get an i-th performance outcome, and storing the i-th performance outcome as an i+1-th electronic official document, then step 206 is implemented.

In one operation flow, the electronic official documents processed by each operation behavior except the first operation behavior are all performance outcomes of the previous operation behavior. That is, the i+1-th electronic official document is the outcome of performing an action specified by the i-th operation behavior on the i-th electronic official document, and the i-th electronic official document is the process object of the i+1-th operation behavior.

Step 206: the value of the integer i is increased by 1 automatically, then return to perform step 204.

Step 207: outputting an M+1-th electronic official document as an overall performance outcome.

As shown in FIG. 2, steps 204-206 constitute a loop. In addition, the two looping items of step 205 and step 206 may be performed continuously and repeatedly, as long as the determination result in step 204 is "No". Step 203 is the initial step for the loop. Moreover, when the determination result in step 207 is "yes", step 207 is executed, that is, step 207 is the step of outputting the overall performance outcome of the operation flow.

The loop formed by step 203 to step 206 can be described as follows: Increasing an integer i from 1 by 1 each time until the integer i reaches M, wherein, after each increase, the following sub-steps are executed one time: the operation user corresponding to an i-th operation behavior performs action specified by the i-th operation behavior on an i-th electronic official document, and the i-th performance outcome would be stored as an i+1-th electronic official document;

It can be seen that, in the present invention, M operation behaviors which can be selected from the set of operation behaviors are sorted as an operation flow in the present invention, thus users can compile a required operation flow according to requirement situations, and then a performance outcome could be obtained by the corresponding operation behaviors could be performed on the electronic official document to be processed successively by each operation user. Therefore, when the nodes in the operation flow are to be added, deleted, modified, the operation flow can be re-compiled by means of adding, deleting, modifying operation behaviors, which greatly reduces the time to change the operation flow, simplifies the processes in the operation flows, thereby facilitates processing the electronic document.

The method may further predefines a step code one-to-one corresponding to each operation behavior of the M operation behaviors in the set of operation behaviors; Then in the Step 201, "Selecting M operation behaviors from the set of operation behaviors" comprising the following sub-steps: selecting M step codes so as to select the M operation behaviors respectively corresponding to the M selected step codes from the set of operation behaviors. Moreover, because in the step 201 it is possible to repeatedly select the same operation behavior, therefore, some of the M step codes selected in the step 201 can also be repeated.

Because each operation behavior corresponds to a particular action, and each action is described by a programming language, it is incapable and not necessary for the users unfamiliar with the programming language to understand the description statements of each operation behavior. And thus a step code corresponding to each operation behavior can be predefined, and an operation behavior could be selected by designating a corresponding step code, thereby the difficulty of selecting operation behaviors could be reduced.

In the step 205 mentioned above, the action specified by the i-th operation behavior includes any quantitative combination in the following action: modifying a title of the i-th electronic official document; modifying a content s of the i-th electronic official document; modifying an author of the i-th electronic official document; examining and approving the contents of the i-th electronic official document; signing on the i-th electronic official document; sealing on the i-th electronic official document. Certainly, other actions used with the electronic official document, should be deemed to be within the scope of the present invention.

In the present invention, after the step 201, and prior to the step 202, further including a sub-step 201-1: removing P operation behaviors from the set of operation behaviors, and sorting the rest M-P operation behaviors into a new operation flow according to a new execution order, wherein, P is a integer no less than 1 and less than M;

Then step 202 is changed as follows: regarding the electronic official document to be processed as a first electronic official document, and inputting it into the first operation behavior in the new operation flow;

Clearly, in step 201-1, some operation behaviors are deleted from the operation flow; and thus the rest operation behaviors are sorted into the new operation flow.

Figure 3:
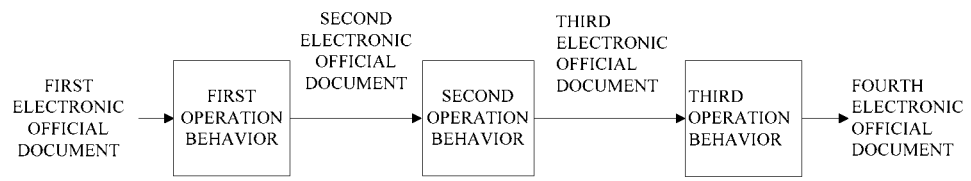
FIG. 3 is a flow diagram of one embodiment of the method for processing the electronic official document according to the present invention.

Certainly, if the operation flow contains the same operation behavior repeatedly, the number of the operation behaviors which appears in the new operation flow can be reduced by deleting operation behaviors in the present invention. FIG. 3 is a flow diagram of one embodiment of the method for processing the electronic official document according to the present invention. As shown in FIG. 3, the first electronic official document is processed by means of the first operation behavior so as to obtain the second electronic official document, and the second electronic official document is processed by means of the second operation behavior so as to obtain the third electronic official document, the third electronic official document is processed by means of the third operation behavior so as to obtain the fourth electronic official document. If the action specified by the first operation behavior, is the same as the action specified by the second operation behavior and the action specified by the third operation behavior, the first, the second and the third operation behavior are the same operation behavior. In addition, under certain circumstances, the third operation behavior is necessary to be removed in FIG. 3, and the first operation behavior and the second operation behavior are retained, therefore, the third operation behavior is possible to be deleted so as not to perform the third operation behavior. Moreover, the new operation flow outputs the performance outcome (the third electronic official document) of the second operation behavior, as the overall performance outcome of the whole new operation flow.

The present invention, after the step 201, before step 202, the step 201-2 may further be included: selecting Q operation behaviors besides the M operation behaviors from the set of operation behaviors, and sorting the selected M+Q operation behaviors into a novel operation flow according to a novel execution order successively; wherein, Q is a integer no less than 1;

Then step 202 is changed as follows: regarding the electronic official document to be processed as a first electronic official document, and inputting it into the first operation behavior in the novel operation flow;

Obviously, in step 201-2, some operation behaviors are added into the novel operation flow, and then all selected operation behaviors are sorted into the novel operation flow.

In the present invention, after the step 1, and prior to the step 2, further including a sub-step 201-3: determining a name in the operation flow.

The sub-step 201-1 and sub-step 201-2 are steps of respectively deleting and adding operation behaviors in the operation flow, and step 201-3 is the step of determining a name in the operation flow. The above three sub-steps are irrelevant from each other, and one step does not have to be implemented after another sub-step. In sub-step 201-1 and in sub-step 201-2, it is easy to delete operation behaviors from the operation flow and add operation behaviors into the operation flow, thus the operation flow can be easily changed or modified.

In conclusion, the present invention has the following advantages:

(1) In the present invention, M operation behaviors which can be selected from the set of operation behaviors are ranked as an operation flow in the present invention, thus users can compile a required operation flow according to requirement situations, and then a performance outcome could be obtained by the corresponding operation behaviors to be performed on the electronic official document to be processed successively by each operation user. Therefore, when the nodes in the operation flow are to be added, deleted, modified, the operation flow can be re-compiled by means of adding, deleting, modifying operation behaviors, which greatly reduces the time to change the operation flow, simplifies the processes in the operation flows, thereby facilitates processing the electronic document.

(2) In the present invention, the step code corresponding to each operation behavior is predefined. Therefore, by means of selecting step codes, operation behaviors performed by the users on the operation element point can be designated, thereby the difficulty of selecting operation behavior is reduced.

The above-mentioned is only preferred embodiments of the present invention, and is not intended to limit the invention. Within the spirit and principle, the present invention of any modification, equivalent replacement, improvement, and so on should be deemed to be within the scope of the present invention.

What is claimed is:

1. A method for processing an electronic official document, wherein, the method predefines an operation behaviors set consisting of N operation behaviors, and N is an integer greater than 1, any two operation behaviors in the operation behaviors set are different from each other; the method comprising:

Step 1: Selecting M operation behaviors from the operation behaviors set according to a requirement for processing the electronic official document, and setting up a corresponding operation user for each one of the M selected operation behaviors, and sorting all of the M selected operation behaviors into an operation flow according to an execution order; wherein, M is an integer no less than 1;

Step 2: regarding the electronic official document to be processed as a first electronic official document, and inputting it into the first operation behavior in the operation flow;

Step 3: Increasing an integer i from 1 by 1 each time until the integer i reaches M, wherein, after each increase, the following sub-steps are executed one time: the operation user corresponding to an i-th operation behavior performs action specified by the i-th operation behavior on an i-th electronic official document so as to get an i-th performance outcome, and storing the i-th performance outcome as an i+1-th electronic official document;

Step 4: outputting an M+1-th electronic official document as an overall performance outcome;

wherein, M is an integer no less than 2;

After the step 1, and prior to the step 2, further comprising a sub-step 1-1: removing P operation behaviors from the operation flow, and sorting the rest M-P operation behaviors into a new operation flow according to a new execution order, wherein, P is an integer no less than 1 and less than M;

Then the Step 2 is changed as follows: regarding the electronic official document to be processed as a first electronic official document, and inputting it into the first operation behavior in the new operation flow;

wherein, after the step 1, and prior to the step 2, further including a sub-step 1-2: Selecting Q operation behaviors besides the M operation behaviors from the operation behaviors set, and sorting the selected M+Q operation behaviors into a novel operation flow according to a novel execution order, wherein, Q is a integer no less than 1;

Then the Step 2 is changed as follows: regarding the electronic official document to be processed as a first electronic official document, and inputting it into the first operation behavior in the novel operation flow.

2. The method according to claim 1, wherein, the method further predefines a step code one-to-one corresponding to each operation behavior of the M operation behaviors in the operation behaviors set; then in the Step 1, "Selecting M operation behaviors from the operation behaviors set" comprising the following sub-steps: selecting M step codes so as to select the M operation behaviors respectively corresponding to the M selected step codes from the operation behaviors set.

3. The method according to claim 2, wherein, M is an integer no less than 2;

After the step 1, and prior to the step 2, further comprising a sub-step 1-1: removing P operation behaviors from the operation flow, and sorting the rest M-P operation behaviors into a new operation flow according to a new execution order, wherein, P is an integer no less than 1 and less than M;

Then the Step 2 is changed as follows: regarding the electronic official document to be processed as a first electronic official document, and inputting it into the first operation behavior in the new operation flow.

4. The method according to claim 2, wherein, after the step 1, and prior to the step 2, further including a sub-step 1-2: Selecting Q operation behaviors besides the M operation behaviors from the operation behaviors set, and sorting the selected M+Q operation behaviors into a novel operation flow according to a novel execution order, wherein, Q is a integer no less than 1;

Then the Step 2 is changed as follows: regarding the electronic official document to be processed as a first electronic official document, and inputting it into the first operation behavior in the novel operation flow.

5. The method according to claim 2, wherein, after the step 1, and prior to the step 2, further including a sub-step 1-3: determining a name of the operation flow.

6. The method as claimed in claim 1, wherein, in the step 3, the action specified by the i-th operation behavior includes: modifying a title of the i-th electronic official document; and/or, modifying a content of the i-th electronic official document; and/or, modifying an author of the i-th electronic official document; and/or, examining and approving the content of the i-th electronic official document; and/or, signing on the i-th electronic official document; and/or, sealing on the i-th electronic official document.

7. The method according to claim 6, wherein, M is an integer no less than 2;

After the step 1, and prior to the step 2, further comprising a sub-step 1-1: removing P operation behaviors from the operation flow, and sorting the rest M-P operation behaviors into a new operation flow according to a new execution order, wherein, P is an integer no less than 1 and less than M;

Then the Step 2 is changed as follows: regarding the electronic official document to be processed as a first electronic official document, and inputting it into the first operation behavior in the new operation flow.

8. The method according to claim 6, wherein, after the step 1, and prior to the step 2, further including a sub-step 1-2: Selecting Q operation behaviors besides the M operation behaviors from the sct of operation behaviors set, and sorting the selected M+Q operation behaviors into a novel operation flow according to a novel execution order, wherein, Q is a integer no less than 1;

Then the Step 2 is changed as follows: regarding the electronic official document to be processed as a first electronic official document, and inputting it into the first operation behavior in the novel operation flow.

9. The method according to claim 6, wherein, after the step 1, and prior to the step 2, further including a sub-step 1-3: determining a name of the operation flow.

10. The method according to claim 1, wherein, after the step 1, and prior to the step 2, further including a sub-step 1-3: determining a name of the operation flow.

* * * * *